United States Patent
Garner et al.

(10) Patent No.: US 8,074,586 B2
(45) Date of Patent: *Dec. 13, 2011

(54) SEED DELIVERY APPARATUS WITH SENSOR AND MOVING MEMBER TO CAPTURE AND MOVE SEED TO A LOWER OUTLET OPENING

(75) Inventors: Elijah Garner, Bettendorf, IA (US); Michael E. Friestad, Rock Island, IL (US); Nathan A. Mariman, Geneseo, IL (US); David J. Rylander, Victoria, IL (US); Daniel B. Thiemke, Sun Prairie, WI (US); James Z. Liu, Belvidere, IL (US); Nikolai R. Tevs, Fargo, ND (US)

(73) Assignee: Deere & Company, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/431,366

(22) Filed: Apr. 28, 2009

(65) Prior Publication Data

US 2010/0192821 A1 Aug. 5, 2010

Related U.S. Application Data

(63) Continuation-in-part of application No. 12/364,010, filed on Feb. 2, 2009.

(51) Int. Cl.
*A01C 7/00* (2006.01)
*A01C 9/00* (2006.01)
*A01C 15/00* (2006.01)

(52) U.S. Cl. ......... 111/171; 111/200; 111/903; 111/904

(58) Field of Classification Search ............... 111/200, 111/903, 904, 170–188

See application file for complete search history.

(56) References Cited

U.S. PATENT DOCUMENTS

| 4,555,624 | A | 11/1985 | Steffen |
| 4,635,215 | A | 1/1987 | Friend |
| 5,533,458 | A | 7/1996 | Bergland et al. |
| 5,650,609 | A | 7/1997 | Mertins et al. |
| 5,936,234 | A | 8/1999 | Thomas et al. |
| 6,651,570 | B1 * | 11/2003 | Thiemke ................... 111/184 |
| 6,681,706 | B2 * | 1/2004 | Sauder et al. ............... 111/171 |
| 6,913,541 | B2 * | 7/2005 | Chen ............................ 473/161 |
| 2003/0159631 | A1 * | 8/2003 | Sauder et al. ............... 111/171 |
| 2007/0039528 | A1 | 2/2007 | Sauder et al. |
| 2010/0010667 | A1 * | 1/2010 | Sauder et al. ............... 700/231 |

FOREIGN PATENT DOCUMENTS

DE 102007031576 A1 * 1/2009
EP 0158985 A2 * 10/1985

OTHER PUBLICATIONS

European Search Report (6 pages).*

* cited by examiner

*Primary Examiner* — Christopher J. Novosad

(57) ABSTRACT

A seed delivery apparatus has a moving member that captures and entraps the seed from the seed meter and physically moves the seed from the meter to the lower outlet opening. In so doing, the seed engages and travels along an interior surface of the seed delivery apparatus. A seed sensor is mounted on the housing wall such that the seed passes directly in front of the sensor. The sensor has both the light emitting devices and the photo-sensitive elements on the same wall of the delivery apparatus, or on two opposed walls. The moving member prevents ambient light, dust and dirt from entering the housing and impacting the sensor output signal.

4 Claims, 4 Drawing Sheets

SEED DELIVERY APPARATUS WITH SENSOR AND MOVING MEMBER TO CAPTURE AND MOVE SEED TO A LOWER OUTLET OPENING

CROSS-REFERENCE TO RELATED APPLICATION

This application is a continuation-in-part of U.S. patent application Ser. No. 12/364,010, filed Feb. 2, 2009.

FIELD OF THE INVENTION

The present invention relates to agricultural seeding machines and in particular to a seed delivery apparatus that captures seed from a seed meter and delivers the seed to a trench formed in the soil there below and which also includes a seed sensor to detect the passage of seed through the delivery apparatus.

BACKGROUND OF THE INVENTION

An agricultural seeding machine, such as a row crop planter or grain drill, places seeds at a desired depth within a plurality of parallel seed trenches formed in soil. In the case of a row crop planter, a plurality of row crop units are typically ground driven using wheels, shafts, sprockets, transfer cases, chains and the like or powered by electric or hydraulic motors. Each row crop unit has a frame which is movably coupled with a tool bar. The frame may carry a main seed hopper, herbicide hopper and insecticide hopper. If a herbicide and insecticide are used, the metering mechanisms associated with dispensing the granular product into the seed trench are relatively simple. On the other hand, the mechanisms necessary to properly meter the seeds, and dispense the seeds at predetermined relative locations within the seed trench are relatively complicated.

The mechanisms associated with metering and placing the seeds generally can be divided into a seed metering system and a seed placement or delivery system which are in series communication with each other. The seed metering system receives the seeds in a bulk manner from the seed hopper carried by the planter frame or by the row unit. Different types of seed metering systems may be used, such as seed plates, finger plates, seed disks, belts, etc. In the case of a seed disk metering system, a seed disk is formed with a plurality of seed cells spaced about the periphery of the disk. Seeds are moved into the seed cells with one or more seeds in each seed cell depending upon the size and configuration of the seed cell. A vacuum or positive air pressure differential may be used in conjunction with the seed disk to assist in movement of the seeds into the seed cell. The seeds are singulated and discharged sequentially at a predetermined rate to the seed placement or delivery system.

The most common seed delivery system may be categorized as a gravity drop system. In the case of the gravity drop system, a seed tube has an inlet end which is positioned below the seed metering system. The singulated seeds from the seed metering system merely drop into the seed tube and fall via gravitational force from a discharge end thereof into the seed trench. Monitoring systems are commonly used to monitor the operation of the planter. Such systems typically employ a seed sensor attached to each seed tube to detect the passage of seed therethrough. Seed sensors are readily available from a number of sources including the Dickey-john Corporation, an example of which is described in U.S. Pat. No. 4,555,624. As described, the photo sensor consists of one or more light emitting devices and one or more photo-sensitive elements generally mounted on opposing sides of the seed tube. A seed passing through the tube momentarily partially obscures the light falling on one or more of the photo-sensitive elements, thereby producing a momentary change in the normal, or steady state signal level output from the sensor. Various problems are associated with this arrangement that effect the accuracy of the monitoring system. One problem is the dust and dirt that are drawn into the seed tube as the planter is operated. Another problem is the degree of ambient light in the seed tube. The greater the ambient light, the harder it is to detect seeds. To counter the effects of dirt, dust, and light, the sensors have been located near the top of the seed tube, away from the lower outlet opening. This however, allows a greater opportunity for variation to occur in the path traveled by the seed after it has past the sensor, affecting the accuracy of seed spacing determinations by the monitor.

SUMMARY OF THE INVENTION

The present invention is a seed delivery apparatus that captures and entraps the seed from the seed meter and physically moves the seed from the meter to the lower outlet opening. In so doing, the seed engages and travels along an interior surface of the seed delivery apparatus. By placing the seed sensor on the housing wall, the seed passes directly in front of the sensor. The sensor preferably has both the light emitting devices and the photo-sensitive elements on the same wall of the delivery apparatus.

DESCRIPTION OF THE PREFERRED EMBODIMENT

Figure 1:
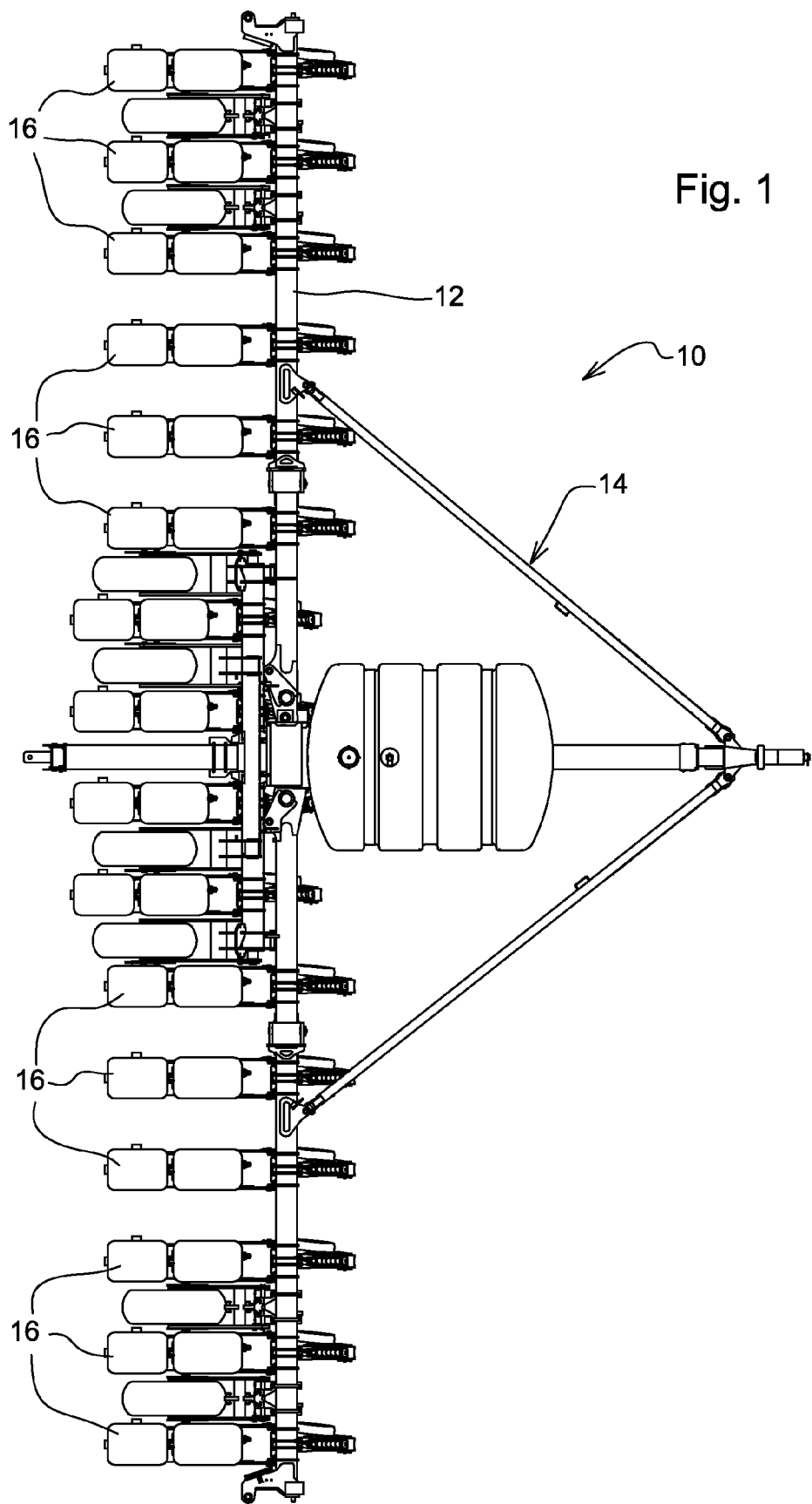
FIG. 1 is a plan view of a planter having the seed delivery apparatus of the present invention.
Figure 2:
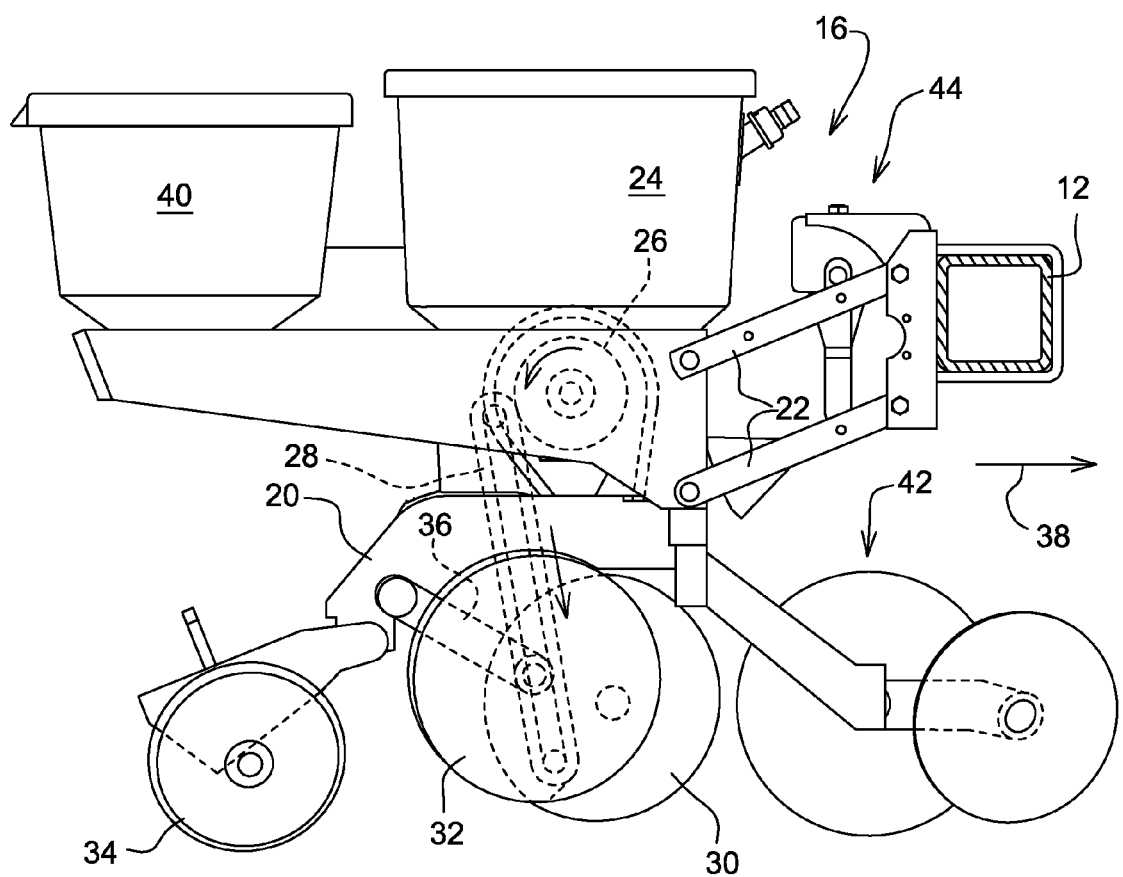
FIG. 2 is a side view of a row unit of the planter of FIG. 1.

With reference to FIG. 1 an example planter or seeding machine 10 is shown containing the seed delivery apparatus of the present invention. Planter 10 includes a tool bar 12 as part of a planter frame 14. Mounted to the tool bar are multiple planting row units 16. Row units 16 are typically identical for a given planter but there may be differences. A row unit 16 is shown in greater detail in FIG. 2. The row unit 16 is provided with a central frame member 20 having a pair of upwardly extending arms 21 (not shown) at the forward end thereof. The arms 21 connect to a parallelogram linkage 22 for mounting the row unit 16 to the tool bar 12 for up and down relative movement between the unit 16 and toolbar 12 in a known manner. Seed is stored in seed hopper 24 and provided to a seed meter 26. Seed meter 26 is of the type that uses a disk and an air pressure differential to retain seed on the disk as are well known to meter seed. Other types of meters can be used as well. Individual seeds are sequentially metered from the seed meter 26 and handed over to a seed delivery apparatus 28 for delivery of the seed to a planting furrow, or trench, formed in the soil by furrow openers 30. Gauge wheels 32 control the depth of the furrow. Closing wheels 34 close the trench over the seed. The gauge wheels 32 are mounted to the frame member 20 by arms 36. The toolbar and row unit are designed to be moved over the ground in a forward working direction identified by the arrow 38.

The row unit 16 further includes a chemical hopper 40, a row cleaner attachment 42 and a down force generator 44. The row unit 16 is shown as an example of the environment in which the delivery apparatus of the present invention is used. The present invention can be used in any of a variety of planting machine types such as, but not limited to, row crop planters, grain drills, air seeders, etc.

Figure 3:
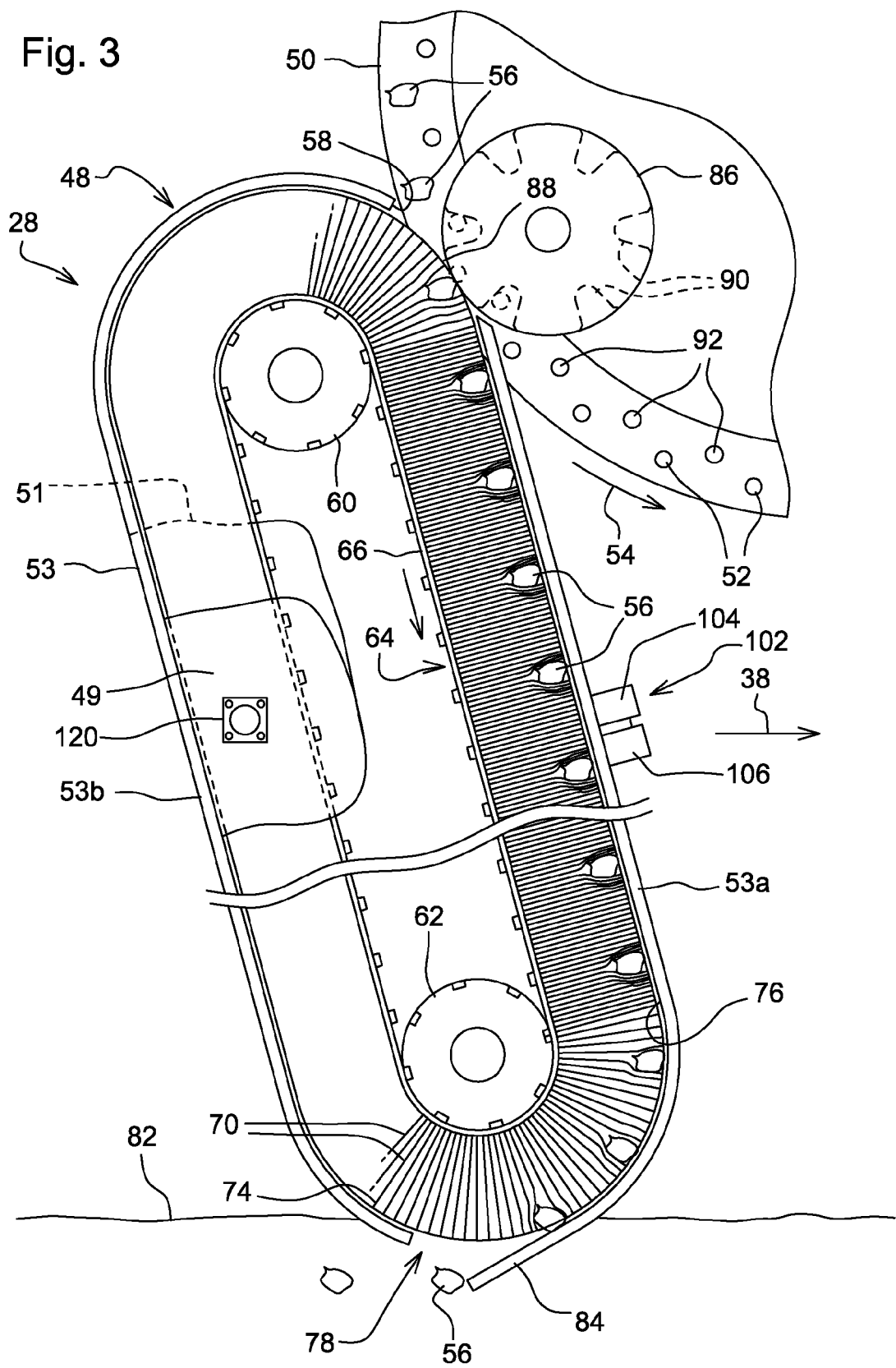
FIG. 3 is an enlarged side view of the seed delivery apparatus of the present invention.

With reference to FIG. 3, the seed delivery apparatus 28 is shown in greater detail. Delivery apparatus 28 includes a housing 48 positioned adjacent the seed disk 50 of the seed meter. The seed disk 50 is a generally flat disk with a plurality of apertures 52 adjacent the periphery of the disk. Seeds 56 are collected on the apertures from a seed pool and adhere to the disk by air pressure differential on the opposite sides of the disk 50 in a known manner. The disk may have a flat surface at the apertures 52 or have recessed seed cells surrounding the apertures 52. The disk rotates counter-clockwise as viewed in FIG. 3 and shown by the arrow 54. At the top of FIG. 3, seeds 56 are shown adhered to the disk.

The seed delivery apparatus housing 48 has right and left laterally spaced opposite walls 49 and 51 and a side wall 53 extending therebetween. An upper opening 58 in the housing side wall 53 admits the seed from the seed meter into the housing. Pulleys 60, 62 mounted inside the housing 48 support a moving member shown as a belt 64 for rotation within the housing. One of the pulleys is a drive pulley while the other pulley is an idler pulley. The belt has a base portion 66 to engage the pulleys and elongated bristles 70 extending therefrom, The bristles are joined to the base portion at proximal, or radially inner, ends of the bristles. Distal, or radially outer, ends 74 of the bristles touch, or are close to touching, the interior surface 76 of the housing side wall 53. A lower housing opening 78 is formed in the side wall 53 and is positioned as close to the bottom of the seed trench as possible. As shown, the lower opening 78 is near or below the soil surface 82 adjacent the trench. The housing side wall forms an exit ramp 84 at the lower opening 78. Ramp 84 may be shorter or longer than shown and may also be curved.

Returning attention to the upper portion of FIG. 3, a loading wheel 86 is provided adjacent the upper opening 58. The loading wheel is positioned on the opposite side of the seeds 56 from the brush 64 such that the path of the seeds on the disk brings the seeds into a nip 88 formed between the loading wheel and the distal ends 74 of the bristles 70. The bottom surface of the loading wheel, facing the seed disk 50, has recesses 90 formed therein. The recesses 90 receive seed agitators 92 projecting from the seed disk 50. The moving agitators, by engagement with the recesses in the loading wheel, drive the loading wheel in a counter-clockwise rotation.

The seed is captured by the delivery apparatus 28 to remove the seed from the seed meter. The seed is then moved by the delivery apparatus to the seed discharge point where the seed is discharged from the housing into the seed trench. From the seed meter to the discharge, the seed is entrapped by the brush bristles and the side wall 53 of the housing. Movement of the seed from the upper opening 58 to the lower opening 78 is controlled by the delivery apparatus, thus maintaining the seed spacing relative to one another. Accelerometer 120 is attached to the housing or placed elsewhere on the row unit 16 to measure the acceleration of the delivery apparatus. Since the seed is entrapped in the brush bristles as it is moved to the lower opening, the acceleration measurement of row unit or housing will be the acceleration of the seed itself. Further details of the delivery apparatus, as well as variations in the arrangement of the delivery apparatus and the orientation of the delivery apparatus in the row unit and relative to the seed meter are shown in U.S. patent application Ser. No. 12/364,010; filed Feb. 2, 2009 and hereby incorporated by reference.

As shown in FIG. 3, the side wall 53 is divided by the upper and lower openings 58, 78 into two segments, 53*a* and 53*b*. Segment 53*a* is between the upper and lower openings in the direction of belt travel while the segment 53*b* is between the lower and upper openings in the direction of belt travel. It is the gaps in the side wall 53 that form the upper and lower openings. It should be understood, however, that the delivery apparatus will function without the segment 53*b* of the side wall. It is only the segment 53*a* that functions together with the belt bristles to deliver the seed from the meter to the seed trench. Thus, the term "upper opening" shall be construed to mean a open area before the side wall segment 53*a* in the direction of belt travel and the term "lower opening" shall mean an open area after the side wall segment 53*a* in the direction of belt travel. The terms "right", "left" and "side" as used in connection with the portions of the housing wall are used only to differentiate between wall portions and should not be interpreted as limiting terms.

Figure 4:
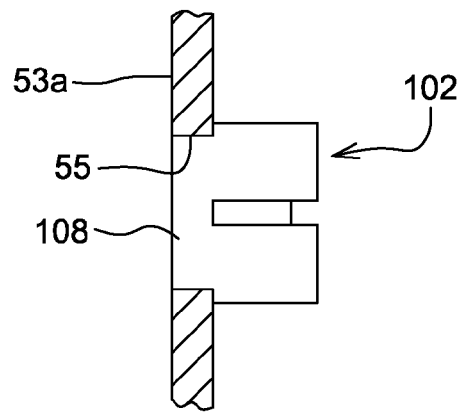
FIG. 4 is a sectional view of the sensor mounted in an opening in the side wall of the delivery apparatus.

A seed sensor 102 is disposed on the side wall 53*a*. The seed sensor has two portions, an emitter 104 and a receiver 106. The emitter emits electromagnetic radiation, for example, light, a portion of which is reflected back to the receiver. In a preferred embodiment of the wall 53*a* has at least a portion of which is transparent or translucent to allow the electromagnetic radiation to pass therethrough. See FIG. 6. Alternatively, as shown in FIG. 4 the side wall 53*a* may have an opening therein into which the sensor lens 108 is seated so that the sensor forms a smooth continuation of the interior surface 76 of the side wall 53*a*. It is important that the interior surface 76 provide a smooth surface for the seed 56 to travel along and not form in the disruptions that can damage the seed or the seed coating.

Figure 5:
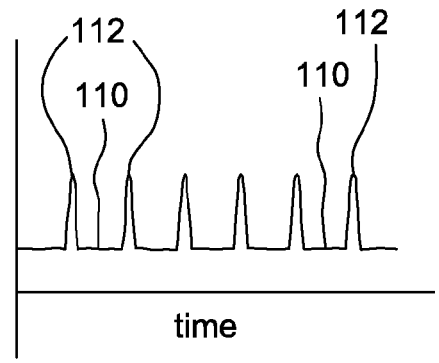
FIG. 5 is a graph of the sensor output signal over time.

During operation, with the brush bristles 70 passing the sensor the majority of the radiation from the emitter 104 is absorbed in the brush bristles and not reflected back to the receiver 106. As a result, absent a seed, the background noise received by the receiver 106 is relatively low. In contrast, when seed 56 passes the sensor the reflected electromagnetic radiation is much higher than the background noise producing a large spike in the signal. This is shown in the graph in FIG. 5 with the large spikes 112 relative to the background noise 110. The large signal to noise ratio is a result of the brush bristles absorbing, not reflecting, the radiation and also by the brush bristles holding the seed against the interior surface 76 of the side wall 53 such that the seeds pass immediately in front of the sensor 102. This contrasts with a conventional seed tube which the seed may pass the sensor at any location within the interior of the seed tube.

The use of the moving member 64 produces other benefits in seed sensing as well. The presence of the bristles 70 within the delivery apparatus blocks light from entering the delivery apparatus through the lower opening 78. In addition dust and other debris can not be drawn into the delivery apparatus by the vacuum used in the seed meter as commonly occurs with seed tubes used today. This allows the seed sensor to be located fairly low in the housing, close to the lower opening. However, because the seed is carried by the moving member 64 through the delivery apparatus, the spacing between adjacent seeds is controlled and maintained as the seeds are moved from the upper opening to the discharge opening. This enables the seed sensor 102 to be located anywhere along the path of the seeds between the upper and lower openings as there is no opportunity for the seed path to change with motion of the row unit.

Figure 6:
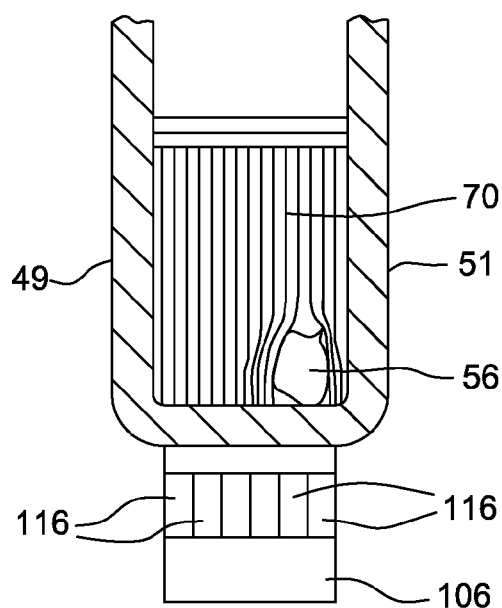
FIG. 6 is a sectional view of the photo-sensitive elements of the sensor.
Figure 7:
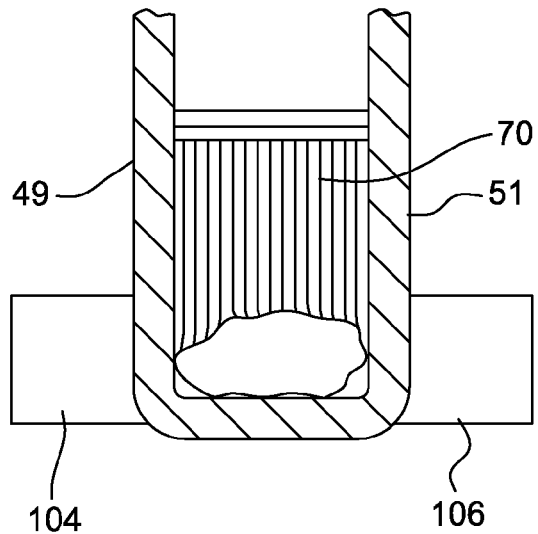
FIG. 7 is a sectional view of an alternative embodiment with the sensor emitter and receiver mounted on opposed walls.

The receiver 106, as shown in FIG. 6, can be equipped with a plurality of photo-sensitive receiving elements 116 spaced laterally along the width of the wall 53a. This can enable of a sensor 102 to not only detect a seed, but also to detect the lateral location of the seed within the delivery apparatus, that is, the seed position relative to the right and left walls 49, 51. This lateral position information can be useful in determining a final position of the seed in the seed trench.

The sensor is mounted on the side wall by any of a variety of means. The sensor can be clipped to the housing, bolted thereto, secured by plastic ties, fastened into support structures formed on the housing, etc. In addition, the side wall may be made of a material, such as plastic resin, that allows the sensor to operate through the side wall, or the side wall may be formed with an opening therein into which the sensor is positioned. The term "mounted on" as used in the claims is to be broadly construed to include all of the above.

The moving member of the delivery system has been described as being a brush belt with bristles. In a broad sense, the bristles form an outer periphery of contiguous disjoint surfaces that engage and grip the seed. While brush bristles are the preferred embodiment, and may be natural or synthetic, other material types can be used to grip the seed such as a foam pad, expanded foam pad, mesh pad or fiber pad, etc.

Having described the preferred embodiment, it will become apparent that various modifications can be made without departing from the scope of the invention as defined in the accompanying claims.

The invention claimed is:

1. A seeding machine, comprising:
   at least one seed metering system; and
   a least on seed delivery system, each said seed delivery system being in communication with a corresponding said seed metering system to receive seed therefrom, each said seed delivery system including:
   a housing having right and left laterally spaced opposite walls and a side wall extending therebetween, the side wall having an upper opening for receiving seed from said corresponding metering system, a lower opening through which seed is discharged, and the side wall having an interior surface extending between the upper and lower openings;
   an endless member within said housing disposed around a first drive pulley and a second idler pulley, said endless member having a gripping portion engaging the interior surface of said housing wall and moving there along as said endless member is driven from said upper opening, where the seed from said seed meter is gripped by said gripping portion and entrapped by said gripping portion and said housing wall, to said lower opening to convey seed to said lower opening and discharge seed there through;
   the housing side wall further having a first segment extending between the upper and lower openings in the direction of travel of the endless member and a second segment extending between the lower and upper openings in the direction of travel of the endless member and
   a seed sensor mounted on the first segment of the side wall of the housing along which the seed is moved from the upper opening to the lower opening to sense the passing of seed through the housing and produce an output signal in response thereto.

2. The seeding machine of claim 1 wherein the sensor has an emitting portion that emits electromagnetic radiation and a receiving portion that receives at least a portion of the electromagnetic radiation and produces an output signal in proportion to the amount of received radiation, both the emitting and receiving portions of the sensor being mounted on the first segment of the side wall which together with the gripping portion of the endless member, entraps the seed.

3. The seeding machine of claim 2 wherein the receiving portion of the sensor has a plurality of receiving elements to locate the position of a passing seed laterally between the right and left spaced walls of the housing.

4. The seeding machine of claim 2 wherein the radiation of the sensor passes through the housing wall material.

* * * * *